United States Patent
Londner et al.

(10) Patent No.: US 12,524,610 B2
(45) Date of Patent: Jan. 13, 2026

(54) INTENT DISCOVERY USING LANGUAGE MODELS

(71) Applicant: Verint Americas Inc., Alpharetta, GA (US)

(72) Inventors: Shmuel Londner, Tel Aviv (IL); Karni Gilon, Herzliya (IL); Ingrid Velleine, Herzliya (IL)

(73) Assignee: Verint Americas Inc., Alpharetta, GA (US)

( * ) Notice: Subject to any disclaimer, the term of this patent is extended or adjusted under 35 U.S.C. 154(b) by 176 days.

(21) Appl. No.: 18/438,381

(22) Filed: Feb. 9, 2024

(65) Prior Publication Data
US 2025/0111145 A1  Apr. 3, 2025

Related U.S. Application Data
(60) Provisional application No. 63/542,065, filed on Oct. 2, 2023.

(51) Int. Cl.
*G06F 40/00* (2020.01)
*G06F 40/20* (2020.01)

(52) U.S. Cl.
CPC .................................. *G06F 40/20* (2020.01)

(58) Field of Classification Search
CPC .... G06F 40/30; G06F 16/355; G06F 16/3347; G06F 16/3329; G06F 16/3344; G06F 16/3346; G06F 40/268; G06F 40/284; G06F 40/279; G06F 40/295; G06F 40/289; G06N 20/00; G06N 20/20; G06N 3/02; G06N 3/042; G06N 3/043; G06N 3/044; G06N 3/0442; G06N 3/045; G06N 3/0455; G06N 3/0464; G06N 3/047; G06N 3/0475; G06N 3/048; G06N 3/082; G06N 3/08; G06N 3/088; G06N 3/0895; G06N 3/09; G06N 3/091; G06N 3/092; G06N 3/094; G06N 3/096; G06N 3/098; G06N 3/0985; G06N 5/01; G06N 5/013; G06N 5/022;
(Continued)

(56) References Cited

U.S. PATENT DOCUMENTS 9,009,046 B1 * 4/2015 Stewart .................. G10L 15/22
                                                  704/270.1
11,061,954 B2 * 7/2021 Alexander .......... G06F 16/3347
(Continued)

*Primary Examiner* — Edgar X Guerra-Erazo
(74) *Attorney, Agent, or Firm* — Dinsmore & Shohl LLP

(57) ABSTRACT

A method for providing an intent expressed in a conversational interaction in narrative form includes detecting a first intent, with a first large language model, from an input comprising at least an interaction transcript and an engineered prompt; generating, with the first large language model, a first narrative for the first intent and a first confidence score corresponding to a probability that the first intent is an intention in fact expressed in the interaction transcript; determining that the first confidence score is greater than or equal to a threshold; checking that the first narrative conforms to fluency and completeness rules, when the first confidence score is greater than or equal to the threshold; and outputting the first narrative as an output detected intent, when the first confidence score is greater than or equal to the threshold and when the first narrative conforms to the fluency and completeness rules.

20 Claims, 8 Drawing Sheets

(58) Field of Classification Search
CPC .......... G06N 5/025; G06N 5/045; G06N 5/04;
G06N 5/048; G10L 15/063; G10L
2015/0631; G10L 2015/0633; G10L
2015/0636; G10L 2015/0635; G10L
15/083; G10L 2015/085; G10L 15/16;
G10L 15/18; G10L 15/1815; G10L
15/1822; G10L 15/22; G10L 2015/221;
G10L 15/222; G10L 2015/223
See application file for complete search history.

(56) References Cited

U.S. PATENT DOCUMENTS

| | | | |
|---|---|---|---|
| 11,061,955 B2* | 7/2021 | Alexander | G06F 16/355 |
| 11,929,066 B2* | 3/2024 | Zhang | G10L 15/197 |
| 12,073,187 B2* | 8/2024 | Freitag | G06F 40/30 |
| 12,288,031 B2* | 4/2025 | Will, IV | H04L 51/02 |
| 12,380,475 B2* | 8/2025 | Zykh | G06F 40/58 |
| 2015/0221304 A1* | 8/2015 | Stewart | G10L 15/26 |
| | | | 704/235 |
| 2020/0097496 A1* | 3/2020 | Alexander | G06F 16/355 |
| 2020/0097563 A1* | 3/2020 | Alexander | G06F 16/355 |
| 2021/0104234 A1* | 4/2021 | Zhang | G06F 40/30 |
| 2022/0101834 A1* | 3/2022 | Chen | G10L 15/1822 |
| 2022/0215184 A1* | 7/2022 | Freitag | G06F 40/30 |
| 2024/0020478 A1* | 1/2024 | Will, IV | H04L 51/02 |
| 2025/0252260 A1* | 8/2025 | Will, IV | H04L 51/02 |

\* cited by examiner

200 →

202 —
Agent: thank you how can we help today
Customer: i was just wondering if you guys could tell me how much was left on the to pay off my phone
Agent: thank you it will come to zero as of march thirteenth right now its fifty four eight remaining [...]
Customer: just cause i cracked my phone so we are just looking to get a new one ...
Agent: yes if you do it online it actually saves you money
Agent: i can give you pricing
Customer: okay
Agent: so what we have here we have the iphone x r in the sixty four gigabyte [for] twenty five dollars a month
[...]
Customer: okay well i will note that down so take a look at it
Agent: yeah definitely have a look you know if you have any issues you can always give us a call 204 —
Why did *Customer* call?

214 —
"the I called to know how much was left to pay off their phone because cracked my phone and looking to get a new one"

221 —
"The customer wanted to know how much was left to pay off their phone [*because the customer wants a new one*]." ← 223

228 —
"The customer wanted to know how much was left to pay off their phone."

*FIG. 2*

INTENT DISCOVERY USING LANGUAGE MODELS

CROSS-REFERENCE TO RELATED APPLICATION

This application claims the benefit of and priority to U.S. Provisional Application No. 63/542,065 filed on Oct. 2, 2023, the disclosure of which is incorporated herein by reference in its entirety.

INTRODUCTION

Technical Field

The present disclosure relates to techniques for determining an intent of a conversational interaction in a narrative form.

BACKGROUND

Customer support services are an obligatory aspect of providing customers services or goods. Customer support services provide a means for a consumer of a service or a good to correspond with a company providing the service or good. Consumers contact customer support services for a wide range or reasons. For example, consumers contact customer support service to make a change to the service, address an issue with the service or good, receive assistance with a service or good, provide feedback to a company, seek information about a service or good, and many other reasons.

Customer support services typically consist of human operated contact centers, or contact centers staffed by a combination of humans and software robots, that correspond with customers via voice call, video call, email, text, instant messages, social messaging, asynchronous chat, or real-time chat. In addition to recording a conversational interaction (also referred to as a session) between a representative of the customer support service and the consumer, other metrics regarding the session may be recorded, in some cases manually by the representative, such as summarizing the interaction. For example, the representative may write up a brief summary of the interaction and submit it with the record of the interaction after the session has completed.

Companies providing services and goods and customer support service operators are increasingly interested in utilizing the conversational interactions to glean information about their services or goods that could lead to improved operations of the customer support service and/or improve or change features of services or goods being provided to consumers and/or lead to opportunities to sell additional goods or services.

SUMMARY

One aspect provides a method for providing an intent expressed in a conversational interaction in narrative form. The method includes detecting a first intent, with a first large language model, from an input comprising at least an interaction transcript and an engineered prompt; generating, with the first large language model, a first narrative for the first intent and a first confidence score corresponding to a probability that the first intent is an intention in fact expressed in the interaction transcript; determining that the first confidence score is greater than or equal to a threshold; checking that the first narrative for the first intent conforms to one or more fluency and completeness rules, when the first confidence score is determined to be greater than or equal to the threshold; and outputting the first narrative as an output detected intent, when the first confidence score is determined to be greater than or equal to the threshold and when the first narrative for the first intent conforms to the one or more fluency and completeness rules.

Another aspect provides, an apparatus configured for providing an intent expressed in a conversational interaction in narrative form, comprising: one or more memories comprising processor-executable instructions; and one or more processors configured to execute the processor-executable instructions and cause the apparatus to: detect a first intent, with a first large language model, from an input comprising an interaction transcript and an engineered prompt; generate, with the first large language model, a first narrative for the first intent and a first confidence score corresponding to a probability that the first intent is an intention in fact expressed in the interaction transcript; determine that the first confidence score is greater than or equal to a threshold; check that the first narrative for the first intent conforms to one or more fluency and completeness rules, when the first confidence score is determined to be greater than or equal to the threshold; and output the first narrative as an output detected intent, when the first confidence score is determined to be greater than or equal to the threshold and when the first narrative for the first intent conforms to the one or more fluency and completeness rules.

Another aspect provides, a method for categorization of intents. The method includes receiving, with an embedding component, a plurality of intents corresponding to conversational interactions; converting, with the embedding component, textual data structure of the plurality of intents into numerical vectors embeddings; discerning, with a categorization component processing the numerical vectors embeddings of the plurality of intents, one or more categories that are present within the plurality of intents; and labeling, with a label generation component, the one or more categories with a keyphrase.

Other aspects provide, a computer program product for providing an intent expressed in a conversational interaction in narrative form, the computer program product comprising instructions, which when executed by a computer, cause the computer to carry out steps comprising: detecting a first intent, with a first large language model, from an input comprising at least an interaction transcript and an engineered prompt; generating, with the first large language model, a first narrative for the first intent and a first confidence score corresponding to a probability that the first intent is an intention in fact expressed in the interaction transcript; determining that the first confidence score is greater than or equal to a threshold; checking that the first narrative for the first intent conforms to one or more fluency and completeness rules, when the first confidence score is determined to be greater than or equal to the threshold; and outputting the first narrative as an output detected intent, when the first confidence score is determined to be greater than or equal to the threshold and when the first narrative for the first intent conforms to the one or more fluency and completeness rules.

These and additional features provided by the embodiments described herein will be more fully understood in view of the following detailed description, in conjunction with the drawings.

DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

FIG. 2 depicts example content input to, generated by, and output from the intent discovery process.

DETAILED DESCRIPTION

Figure 1:
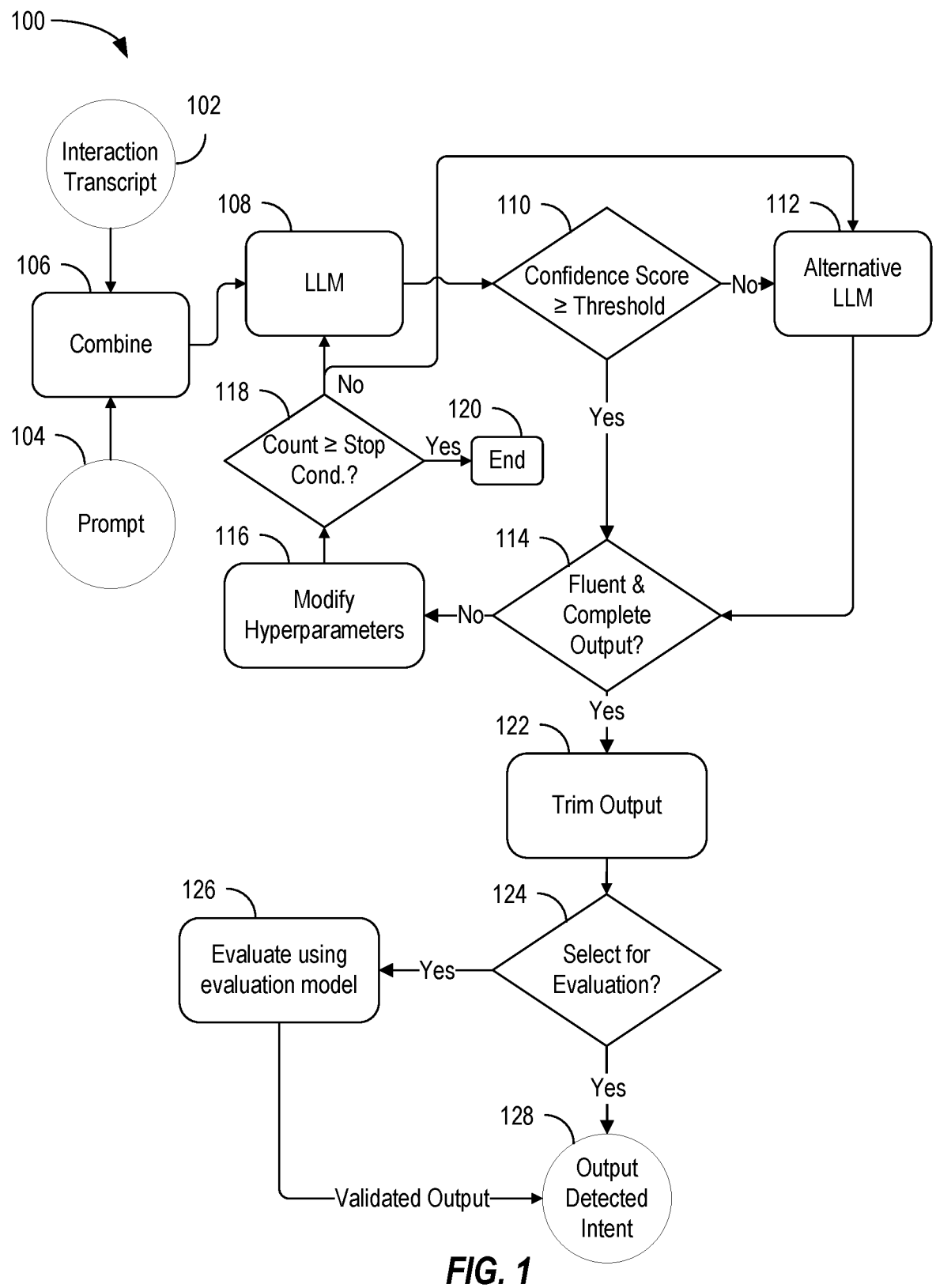
FIG. 1 schematically depicts an illustrative block diagram of an intent discovery process for determining an intent of a conversational interaction in a narrative form.

Embodiments of the present disclosure are directed to techniques for determining an intent of a conversational interaction in a narrative form. The techniques described herein may be utilized on a variety of conversational interactions. For example, conversational interactions may arise from any type of interaction between two or more entities. The types of interactions may include human-to-human interactions, human-to-chatbot interactions, or even chatbot-to-chatbot interactions. As used herein, chatbot refers to artificial intelligence-based engines configured to simulate human conversation through text, video, and/or voice. The means in which the interactions may occur include, but are not limited to voice calls, video calls, emails, text, instant messages, social messaging, asynchronous chat, and real-time chats.

Mechanisms for recording conversational interactions exist. For example, a video or voice call may be recorded into a media file. In real-time, near real-time, or at a later time, the media file can be transcribed into a text-based file converting at least audio aspects of the media into readable text. Text based conversational interactions can be recorded and stored as a text-based data file.

Companies offering services or goods to consumers or customer support services desire to utilize the recorded content from conversational interactions for a variety of purposes. Companies may desire to learn about their consumers' interactions with a service or good, what issues there may be with the current service or good offerings, and many other metrics about their services and goods that a consumer may express in communications with customer support services. Additionally, companies may desire to extract information from the conversational interactions to change or improve future interactions with consumers or to sell additional goods or services. In general, there is an overarching desire by companies offering services or goods and customer support service operators to attain value from the conversational interactions.

When entities such as a company offering services or goods to consumers or customer support services, such as a contact center or chatbot operator, seek to extract information from the recorded conversational interactions, significant efforts and resources including many manual human-based tasks are currently required. For example, the largely unstructured dataset generated from conversational interactions needs to be labeled so filtering techniques can be applied to select conversational interactions that are relevant to a further analysis process or use in a company's systems.

An initial process of classifying recorded conversational interactions, to identify which ones of the recorded conversational interactions should be analyzed in detail, currently relies on human-generated summaries included with the recorded conversational interactions. These summaries may be generated in written form by a representative of the customer support service following an interaction (e.g., a voice-based, video-based, or text-based conversation with a consumer). However, for a variety of reasons, such as a lack of motivation by the representative to complete the written summary or an inaccurate interpretation of the intent of a conversational interaction by the representative, the written summary for a conversation interaction may provide little or no usable information due to incompleteness or inaccuracies.

The initial process of labeling the recorded conversational interactions with at least the intent for the interaction, is a technically important process for the further use of the recorded conversational interactions. For example, it may not be technically feasible or permissible within an amount of time available, for analysis and processing systems to ingest and analyze voluminous amounts of information that may not be relevant to the purpose of the analysis or processing. For example, an analytics system seeking to analyze conversational interactions involving, for example, the cancelation of services, should not need to analyze the full transcripts of all recorded conversational interactions to determine which subset include an intent for the interaction that corresponds to cancelation of services. Instead, the analytics system, based on an intent attribution already stored with the recorded conversational interaction, can filter, identify, and/or select relevant recorded conversational interactions for processing. When the intent is accurately determined and is in a narrative format, the aforementioned processes can be implemented without employing large amounts of additional computing resources and time.

As another example, the intent of a conversational interaction may be logged and stored with reference to a profile of a consumer and the history of the interaction. In a related example, the intent of the conversational interaction is summarized in written form manually by a first representative corresponding with the consumer before transferring the consumer to interact with a second representative to render additional assistance. Under current processes involving the transfer of an interaction from the first representative to a second representative, the second representative utilizes the intent summarized and written by the first representative to pick up the conversation with the consumer without requiring the second representative to review a transcript of the conversation or require the consumer to repeat their intent. However, as noted above, the current process of manually identifying the intent and summarizing it in written form is rife with problems. For example, a first representative can fail to properly identify the intent of the consumer's correspondence and/or may provide a summary that is not fluent or complete or fail to provide a summary at all. In all such cases, the second representative does not receive a clear narrative and/or accurate intent.

To address inaccuracy in determining the intent from a recorded conversational interaction and provide a clear, fluent narrative that is easily readable by either a human or a machine, the following technical solutions are provided. Aspects described herein provide techniques that automate the identification of an intent in a recorded conversational interaction and generate an output in narrative fashion of the detected intent. The term intent may be interchangeably referred to as purpose herein. The technical solutions described herein leverage the capabilities of large language models by inputting a combination of a recorded conversational interaction (e.g., a transcript of the interaction) with an engineered prompt to detect a consumer's intent expressed in the recorded conversational interaction. As described in more detail herein the detected intent is further evaluated and refined, for example, using rule-based models and algorithms that validate and/or transform the detected intent into a clear, fluent narrative of the intent.

The technical solutions for determining an intent of a conversational interaction in a narrative form provide the technical benefit of reducing or eliminating the need for reliance on human intervention in determining the intent, providing more accurate intents, and confirming that the generated output is provided in a narrative that is readable and complete.

The techniques described herein can be implemented in a variety of manners. For example, customer support services, such as contact centers, may implement the techniques to determine real-time or near-real-time intents expressed during an interaction with a consumer. Real-time or near-real-time intent determination enables representatives to be provided with or quickly access information that may be important to the conversation, thus improving the interaction with the consumer and potentially reducing the interaction time. Additionally, in some instances, the real-time or near-real-time intent enables a seamless transfer of interactions between representatives. That is, relaying an accurate and readable intent for an interaction in narrative form between representatives reduces the need for a representative to inquire a second time as to the intent of the consumer's call and/or the need to take time and review the transcript with the previous representative. This also applies to situations where a consumer calls back. For example, the intent may be retained with a consumer's profile and be presented to a subsequent representative when the consumer calls back. In some embodiments, the intent is stored for later use in training operations of the model and/or refining rules-based operations of the present process.

Aspects Related to Determining an Intent of a Conversational Interaction

Turning to FIG. 1, an illustrative block diagram 100 of an intent discovery process for determining an intent of a conversational interaction in a narrative form is depicted. The intent discovery process depicted in FIG. 1 will further be described with reference to the example content 200 input to, generated by, and output from the intent discovery process that is depicted in FIG. 2. The intent discovery process may be implemented by an apparatus having one or more memories with process-executable instructions, and one or more processors configured to execute the process-executable instructions. A feature of the intent discovery process described herein is that the process does not depend on a specific domain or subject matter.

Interaction transcripts are generated, at step 102, from conversational interactions between two or more entities. The conversational interactions between two or more entities may be recorded in the form of audio, video, and/or text data. The data format of the recorded conversational interactions may be structured or unstructured. Therefore, to generate the interaction transcripts, one or more transcription tools, such as an audio-to-text or video-to-text conversion applications, may be used. For example, an example of an interaction transcript 202 is depicted in FIG. 2. Here, an audio conversation between an agent and a customer is transcribed into a text file. The interaction transcript can be stored in a data storage device that is accessible via a network by the apparatus or optionally stored in the one or more memories of the apparatus.

To initiate a large language model (LLM) to perform an operation, generally, a prompt needs to be provided to the LLM. LLMs are a type of artificial intelligence model that have been trained through deep learning algorithms to recognize, generate, translate, and/or summarize vast quantities of written human language and textual data based on user input. The techniques described herein provide solutions that enable one or more LLMs to detect intents from conversational interactions and output a fluent, clear narrative that can readily be used by one or more other computer based applications or human representatives.

A prompt is a generated input to which the LLM is meant to respond. Prompts can include instructions, questions, or any other type of input, depending on the intended use of the LLM. Prompts play a critical role in obtaining optimal results from the LLM, and how a prompt is written can affect the output that is generated. Accordingly, carefully designed prompts, referred to herein as an engineered prompts, are developed to generate desired outputs. The prompt is engineered so as to elicit an abstractive description of the intent, such as "The customer called to cancel her account" as opposed to "Cancel account" which is telegraphic speech and would not be an acceptable output because the output does not provide a narrative of the intent.

An example engineered prompt 204 is depicted in FIG. 2. At step 104, one or more processes for engineering prompts is conducted. For example, engineered prompt 204 is "Why did Customer call?" This prompt was refined from a previous version that was tried which recited "Why did the customer call?" because it was determined that the revised version provided better results from the LLM. This is merely an example to illustrate that subtle changes to the prompt can affect the output generated by an LLM. Other example prompts may include "What is the intent of the interaction?" and "Here follows the reason why the customer called." In some embodiments, at step 104, a predetermined list of prompts is available such that the system can automatically select an engineered prompt 204 from the predetermined list of prompts to be utilized by the intent discovery process. The intent discovery process may automatically iterate through one or more prompts defined in the predetermined list of prompts. Meanwhile, a user may override the automatic selection and implementation of an engineered prompt 204 from the predefined list of prompts with a manually selected and/or entered prompt.

The process of engineering prompts, for example, at step 104 may include iterating through multiple prompts with the same set of input data and comparing the outputs that are generated to determine the optimal engineered prompt for an operation. One or more optimal engineered prompts may be generated and manually selected or automatically selected and implemented with a first LLM as described with reference to step 106.

At step 106, the interaction transcript 202 and the engineered prompt 204 is combined for input into a first LLM. The combination of the interaction transcript 202 and the engineered prompt 204 form an input string in this example. In some aspects, the input to the first LLM may include an agent screen capture from the interaction, or voice and/or video clips of the interaction. In such aspects, the LLMs may be configured to receive inputs other than text input strings, and combine or pre-process the additional information, for example convert to a textual representation or the like so that it can be processed by the LLMs.

At step 108, the input string is processed by a machine-learning model, such as an LLM. Examples of LLMs include OpenAI's ChatGPT, Nvidia's NeMO™ LLM, Meta's LLaMa, Google's BERT. The process described herein can implement one or more LLMs currently developed or that may be developed in the future.

The first LLM, based on the input string comprising the interaction transcript 202 and the engineered prompt 204, generates one or more outputs. In aspects of the present disclosure, the engineered prompt 204 is designed to instruct the first LLM to detect the intent expressed in the interaction transcript 202. The one or more outputs generated by the first LLM include, for example, a narrative of the detected intent and a confidence score. The confidence score is a value the LLM generates indicating a probability that the narrative of the detected intent output by the LLM is an intention in fact expressed in the interaction transcript 202. The confidence score may be a value between 0 and 1.

At step 110, the intent discovery process implements a decision process based on the confidence score. More specifically, at step 110, a determination is made as to whether the confidence score is greater than or equal to threshold value. The threshold value can be preset and is optionally adjustable by the user or application implementing the intent discovery process.

If the determination is "No" at step 110, the process proceeds to step 112. At step 112, the input generated at step 106 is ingested by a second LLM, which is different than the first LLM. The first LLM and the second LLM may be different models or the same type of model that is trained differently or configured with different hyperparameters. In some instances, the first LLM or the second LLM may be a low complexity model in order to implement fast processes or implement fewer resources than a complex model. That is, avoiding the more complex model when it is not needed can be beneficial for resource efficiency such as reducing the computation power, memory resources, power, and/or latency.

Like the first LLM, the second LLM generates one or more outputs including, for example, a narrative of the detected intent and a confidence score. In some aspects, the confidence score generated by the second LLM is again checked to determine whether it is greater than or equal to the threshold at step 110, thus implementing iteration into the employment of different LLMs. However, in some aspects, the narrative of the detected intent by the second LLM is passed to step 114.

Returning briefly to step 110, if the determination is "Yes" at step 110, the process proceeds to step 114. At step 114, the narrative of the detected intent, either generated by the first LLM, the second LLM, or another LLM from steps 108-112 is subjected to a rules-based fluency and completeness check. For example, FIG. 2 depicts an example narrative 214 of the detected intent. The example narrative 214 is "the I called to know how much was left to pay off their phone because cracked my phone and looking to get a new one".

The rules-based fluency and completeness check at step 114 applies rules to determine whether the narrative 214 meets objectives such as grammar, spelling, punctuation, and other aspects of the English language or another language. In some embodiments, an artificial intelligence (AI) model that is configured to check grammar, spelling, punctuation, and other aspects of the English language or another language may be implemented at step 114. The AI model may be implement in conjunction with or independently from the rules-based fluency and completeness check process. For example, as illustrated in the example narrative 214, there a number of issues that may be flagged by the rules-based fluency and completeness check at step 114. First, the example narrative 214 does not have proper capitalization at the beginning of the sentence. Second, the wrong expression of the subject, "I", is used instead of, for example, "customer." Third, the example narrative 214 is a missing a subject between the words "because" and "cracked." Fourth, the example narrative 214 does not have an ending punctuation mark. These and other issues may be identified by the rules-based fluency and completeness check at step 114. When the rules-based fluency and completeness check at step 114 determines that the narrative 214 of the detected intent does not conform to the predefined rules, for example, "No" at step 114, the process proceeds to step 116.

At step 116, modifications to hyperparameters may be made to the LLM (e.g., either the first LLM or the second LLM) that generated the current example narrative 214. The modifications may include changes to the hyperparameters. For example, hyperparameter values of LLMs may include output length, beams number, and the like. Output length refers to the length of the output or a range of length the output of the LLM should be. In some instances, the LLM may output long incoherent narratives that fail to succinctly identify the intent. Beams number, such as beam size or beam width, is an aspect of a beam search strategy that considers multiple best options based on beamwidth using conditional probability.

If fluency or incompleteness issues are detected at step 114, such as an incomplete sentence, the LLM is iteratively run using different hyperparameters (such as minimal and maximal output length, beams number), until a fluent and complete output is generated. Using different hyperparameters or changing values of implemented hyperparameters can cause different outputs to be generated by the LLM. For example, if a longer output is desired, the output length generation parameters can be increased. By increasing the output length generation parameters, there is also a high (or increased) probability that the LLM will generate a complete sentence. The temperature and beam size hyperparameters can also be varied to get a more varied output, which may solve fluency issues. The hyperparameters can also be tuned to fit a user's style requirements, such as phrasing, length, or level of detail. Other fluency issues can be resolved by rule-based post processing, such as trimming and capitalization, for example, at step 122.

In some embodiments, at step 114, if fluency or incompleteness issues are detected by either the rules-based fluency and completeness check or by an AI model configured to check grammar, spelling, punctuation, and other aspects of the English language or another language, the AI model may automatically correct any detected grammar, spelling, punctuation, and/or other issues with the narrative of the detected intent. The AI model may serve to supplement the LLM 108 such that adjustments to the LLM 108 may not be needed to continue with the intent discovery process as the AI model could fix the language specific issues.

In some aspects, the process may include step 118, which is a counter that records and determines whether the process of modifying hyperparameters has iterated more than a specific number of times. If the count, for example, the number of iterations exceeds the stop condition, "Yes" at step 118, the process proceeds to step 120 and ends. If the count, for example, the number of iterations does not exceed the stop condition, "No" at step 118, the process proceeds to either step 108 or step 112 depending on which LLM generated the current example narrative 214 evaluated at step 114. The LLM that generated the current example narrative 214 may be tracked in the process by attaching a flag or other data indicator to the current example narrative 214.

Returning to step 114, either after the initial iteration or an additional iteration of the LLMs generating a narrative 214 of the of the detected intent, when the rules-based fluency and completeness check at step 114 determines that the narrative 214 of the detected intent from conforms to the predefined rules, for example, "Yes" at step 114, the process proceeds to step 122. For example, a conforming narrative 221 is depicted in FIG. 2.

In some instances, at step 122, another rules-based process is implemented. Here, the conforming narrative 221 is a fairly long narrative and includes some additional narration that is not specific to the intent. The conforming narrative 221 is "The customer wanted to know how much was left to pay off their phone because the customer wants a new one." The rules-based process at step 122 may determine that the length exceeds a specified value and thereby implement a trimming operation that trims a portion 223 from the conforming narrative 221 as depicted in FIG. 2, for example. The trimming operation reduces the length of the conforming narrative to be equal to or less than a predefined length. While the trimming operation is optional, the trimming operation may provide the benefit of assuring that a narrative is concise and/or conforms with a text length requirement for a secondary process such as an intent categorization process or a reporting and storing process. In some aspects, the rules-based process at step 122 may also determine and implement other rules such as checking whether there are capitalization or punctuation issues and subsequently correcting them without requiring additional processing by the LLMs.

In some instances, the output from the rules-based process at step 122 is the final output detected intent 228 as depicted in FIG. 2, for example. However, in some instances, the process includes step 124 which includes a random selection operation for further evaluation of the final output detected intent 228. The selection process at step 124 may be a probabilistic selection whereby a fixed number of outputs per day or per quantity are selected for further evaluation. The selection process at step 124 can be based on quantity and frequency as two examples. In some instances, the selection process at step 124 is triggered by continuously low confidence scores being produced by the LLMs. For example, the system may track the confidence scores over time and if it is determined, that the confidence scores remain below a second predetermined threshold then selection of additional outputs for further evaluation may be triggered. Accordingly, the process implements a self-evaluation routine. This may be implemented even if the confidence scores are above the threshold in step 110, but are below the second predetermined threshold specified for step 124.

When an output is selected for further evaluation, for example a "Yes" determination at step 124, the process proceeds to step 126. At step 126, another LLM (and potentially a larger or more complex language model), referred to as an expert model, for example, T0++ or Google's Flan-T5-XL models, may be implemented to further evaluate the interaction transcript 202 and engineered prompt 204. The generated output from the expert model can be used as the new detected intent narrative or to correct the intent detected by the previous iteration of the LLMs in step 108 or 112. The output from step 126 is considered a validated output and replaces the trimmed conforming narrative 221 output from step 122.

In some aspects, if the expert model also flags low confidence, then the expert model may be used to generate a corrected intent. Alternatively, in all cases, if the original LLM flagged low confidence, then the larger language model generates a new, corrected intent. Alternatively, if the generated intent is flagged as low confidence by the expert model, no further attempts may be made and the output is tagged as "to be reviewed" and can be escalated for offline manual review. Results of automatic self-evaluation are logged for statistics and active learning. In the case of change in "low confidence" statistics, a review may be required to check for possible data drift. For example, drift refers to instances where the data that is processed during production strays away from the characteristics of the training data in such a way that it affects performance. When drift occurs, retraining, tuning, or updating the model may be required.

At step 128, the final output detected intent 228 is output by the process. The process may output the final output detected intent 228 to be stored in a memory location for later use or transmitted to a system such as a customer service center platform conducting conversational interactions with the customer. As described herein, the aforementioned process can be implemented in real-time or near-real-time with active customer interactions or as a post-process offline that ingests interaction transcripts and outputs detected intents in narrative form.

Aspects Related to Determining an Intent of a Conversational Interaction

Figure 3A:
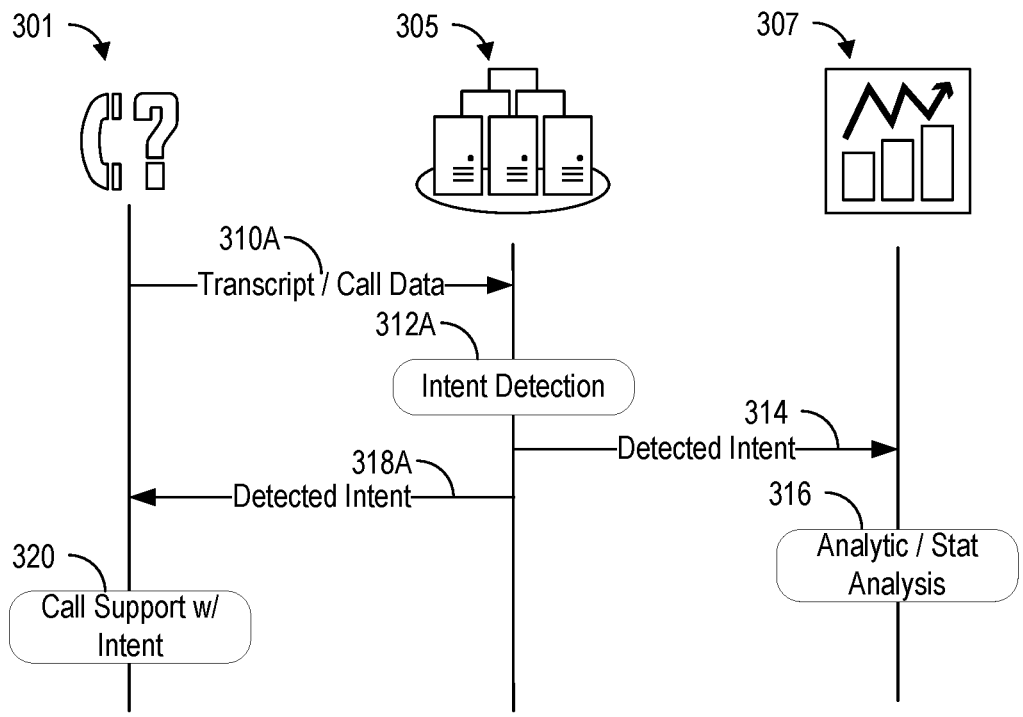
FIG. 3A depicts a first illustrative implementation of the intent discovery process.
Figure 3B:
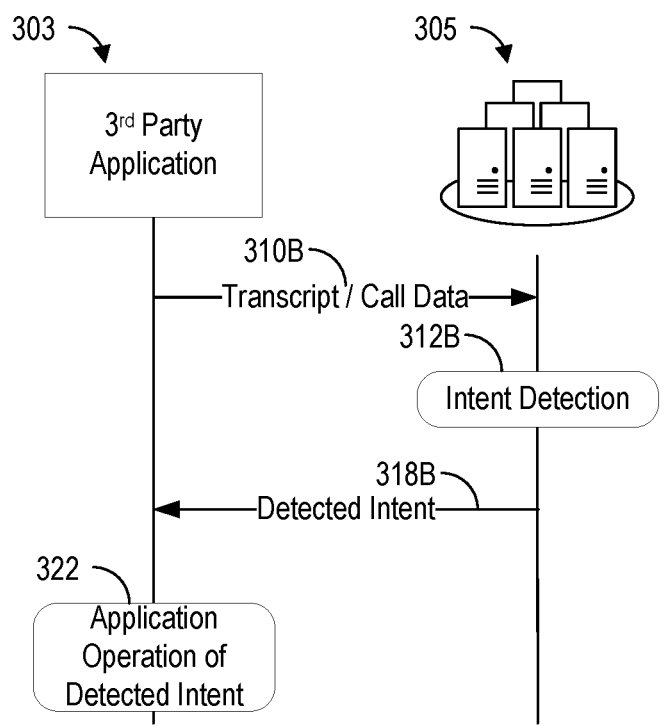
FIG. 3B depicts a second illustrative implementation of the intent discovery process.

FIGS. 3A and 3B illustrative implementations of the intent discovery process described herein. FIG. 3A depicts a first illustrative implementation of the intent discovery process in the context of a customer support service, such as a contact center.

For example, a customer support service 301, such as a contact center, receives calls or chats from customers where representatives of the customer support service 301 interact with the customer. The interactions generate transcripts that are transmitted or exported at step 310A to an intent discovery apparatus 305. The intent discovery apparatus 305 may be an apparatus such as a computing device, server, cloud-based process, or the like configured to implement the intent discovery process, for example, as depicted and described with reference to at least FIG. 1. The intent discovery apparatus 305 at step 312A executes the intent discovery process that generates a detected intent from the interaction transcripts.

The intent discovery apparatus 305 may store the detected intent that was generated in narrative form in one or more memories of the apparatus or output the detected intent to one or more other applications or apparatuses. For example, at step 314, the intent discovery apparatus 305 may transmit the detected intent to an analytics engine 307 or other system that compiles and processes a plurality of interaction transcripts and the corresponding detected intents. For example, the analytics engine 307 may analyze the received plurality of interaction transcripts and the corresponding detected intents to identify improvements for customer support service operations or for goods or services that a consumer is discussing in their interaction with the customer support service 301.

In some aspects, the intent discovery apparatus 305 returns the detected intent to a contact center platform of the customer support service 301, at step 318A, for use in real-time or near-real-time. In such instances, a representative or multiple representatives interacting with the customer may leverage the detected intent to locate information that can support or help address the intent of the customer's call at step 320. For example, the detected intent may be used as a search query to search for information pertaining to a service or good for which the customer is seeking support. This may be particularly useful, for example, for technical support contact centers where representatives are working with a customer to troubleshoot a problem.

FIG. 3B depicts a second illustrative implementation of the intent discovery process implemented as a service that may be accessed by a third party application 303.

For example, a third party application 303 may require a tool for detecting intents from interaction transcripts but does not itself include such a feature. As such, the third party application 303 at step 310B, similar to step 310A, provides interaction transcripts to the intent discovery apparatus 305. The intent discovery apparatus 305 at step 312B, similar to step 312A, executes the intent discovery process that generates a detected intent from the interaction transcripts. Then, at step 318B, which is similar to step 318A, returns the detected intent to the third party application 303 for the third party application's use at step 322. In some aspects, the intent discovery process may be configured as an application programing interface (API) enabling a distinct function within the third party application 303.

Figure 4:
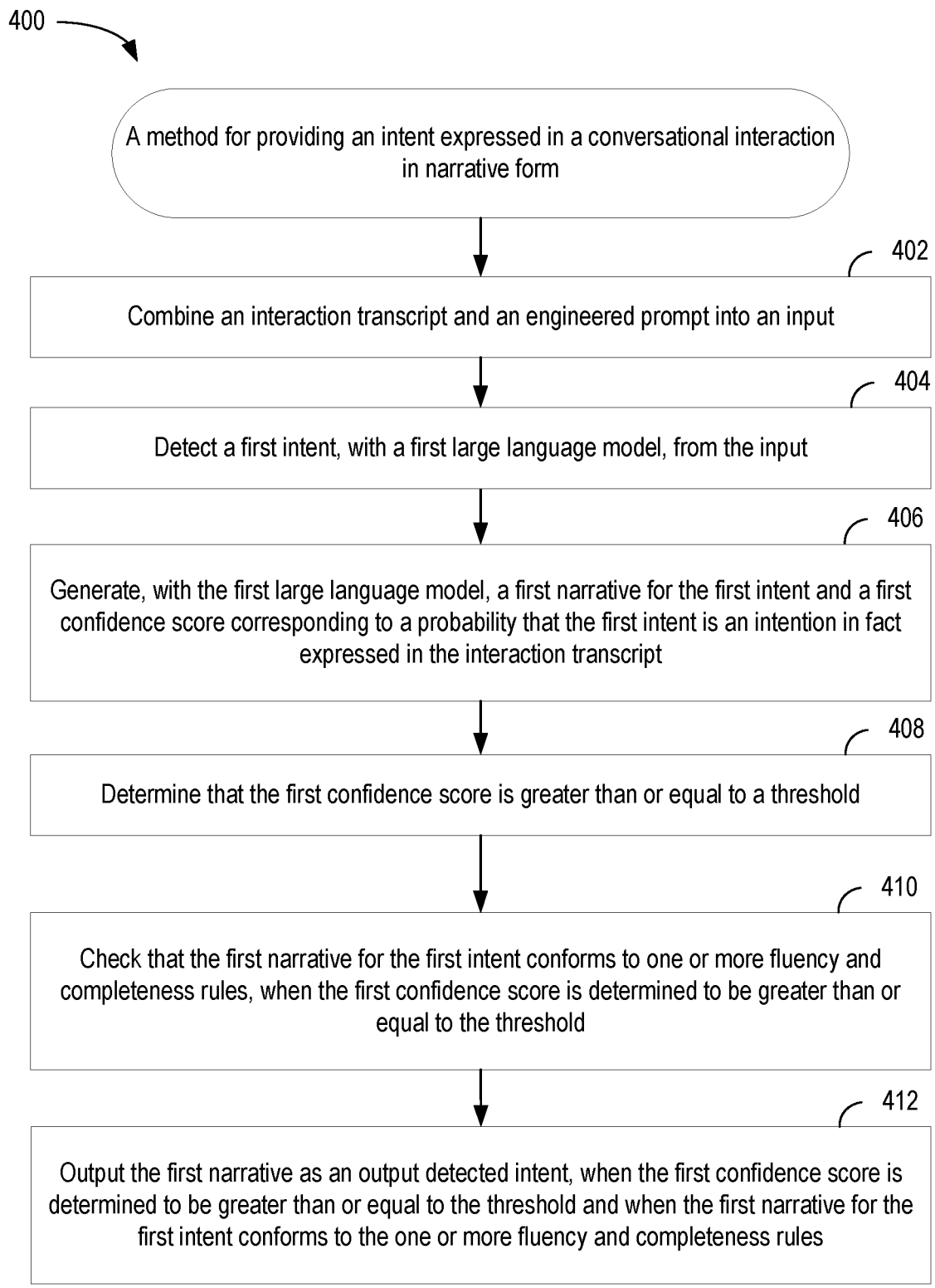
FIG. 4 depicts an illustrative flowchart for an example method for determining an intent of a conversational interaction in a narrative form.

Example Method for Providing an Intent Expressed in a Conversational Interaction in a Narrative Form FIG. 4 depicts an example method for providing an intent expressed in a conversational interaction in a narrative form.

In this example, method 400 begins at step 402 with combining an interaction transcript and an engineered prompt into an input. For example, step 402 may be performed by the intent discovery apparatus 305 as described above with reference to FIG. 3 that is configured to perform the process corresponding to step 106 as described above with reference to FIG. 1.

Method 400 proceeds to step 404 with detecting a first intent, with a first large language model, from an input comprising at least the interaction transcript and the engineered prompt. For example, step 404 may be performed by the intent discovery apparatus 305 as described above with reference to FIG. 3 that is configured to perform the process corresponding to step 108 as described above with reference to FIG. 1.

Method 400 proceeds to step 406 with generating, with the first large language model, a first narrative for the first intent and a first confidence score corresponding to a probability that the first intent is an intention in fact expressed in the interaction transcript. For example, step 406 may be performed by the intent discovery apparatus 305 as described above with reference to FIG. 3 that is configured to perform the process corresponding to step 108 as described above with reference to FIG. 1.

Method 400 then proceeds to step 408 with determining that the first confidence score is greater than or equal to a threshold. For example, thresholds have a value between 0 and 1. In some aspects, the threshold is set to 0.3, 0.4, 0.5, 0.6, 0.7, 0.8, 0.9, or a value equal to or less than 1. For example, step 408 may be performed by the intent discovery apparatus 305 as described above with reference to FIG. 3 that is configured to perform the process corresponding to step 110 as described above with reference to FIG. 1.

Method 400 then proceeds to step 410 with checking that the first narrative for the first intent conforms to one or more fluency and completeness rules, when the first confidence score is determined to be greater than or equal to the threshold. For example, step 410 may be performed by the intent discovery apparatus 305 as described above with reference to FIG. 3 that is configured to perform the process corresponding to step 114 as described above with reference to FIG. 1.

Method 400 then proceeds to step 412 with outputting the first narrative as an output detected intent, when the first confidence score is determined to be greater than or equal to the threshold and when the first narrative for the first intent conforms to the one or more fluency and completeness rules. For example, step 412 may be performed by the intent discovery apparatus 305 that is configured to perform the process corresponding to step 128 as described above with reference to FIG. 1.

In some aspects, the method further includes modifying one or more hyperparameters of the first large language model when the first narrative for the first intent does not conform to the one or more fluency and completeness rules. For example, modifying one or more hyperparameters may be performed by the intent discovery apparatus 305 as described above with reference to FIG. 3 that is configured to perform the process corresponding to step 116 as described above with reference to FIG. 1.

In some aspects, the method further includes causing the first large language model to implement the modified one or more hyperparameters and to generate an updated first narrative for the first intent.

In some aspects, the method further includes checking that the updated first narrative conforms to the one or more fluency and completeness rules.

In some aspects, the method further includes outputting the updated first narrative as the output detected intent, when the updated first narrative conforms to the one or more fluency and completeness rules.

In some aspects, the method further includes determining that the first confidence score is less than the threshold. For example, when the first confidence score is determined to be less than the threshold the intent discovery apparatus 305 as described above with reference to FIG. 3 can be configured to perform the process corresponding to step 112 as described above with reference to FIG. 1. That is, the method may include detecting a second intent, with a second large language model, from the input and generating, with the second large language model, a second narrative for the second intent and a second confidence score corresponding to a probability that the second intent is the intention in fact expressed in the interaction transcript. In the aforementioned aspect, the method may further include checking that the second narrative for the second intent conforms to the one or more fluency and completeness rules and outputting the second narrative as the output detected intent, when the second narrative for the second intent conforms to the one or more fluency and completeness rules.

In some aspects, the method further includes trimming a length of the first narrative to be equal to or less than a predefined length. For example, trimming a length of the first narrative may be performed by the intent discovery apparatus 305 as described above with reference to FIG. 3 that is configured to perform the process corresponding to step 122 as described above with reference to FIG. 1.

Note that FIG. 4 is just one example of a method, and other methods including fewer, additional, or alternative steps are possible consistent with this disclosure.

Figure 5:
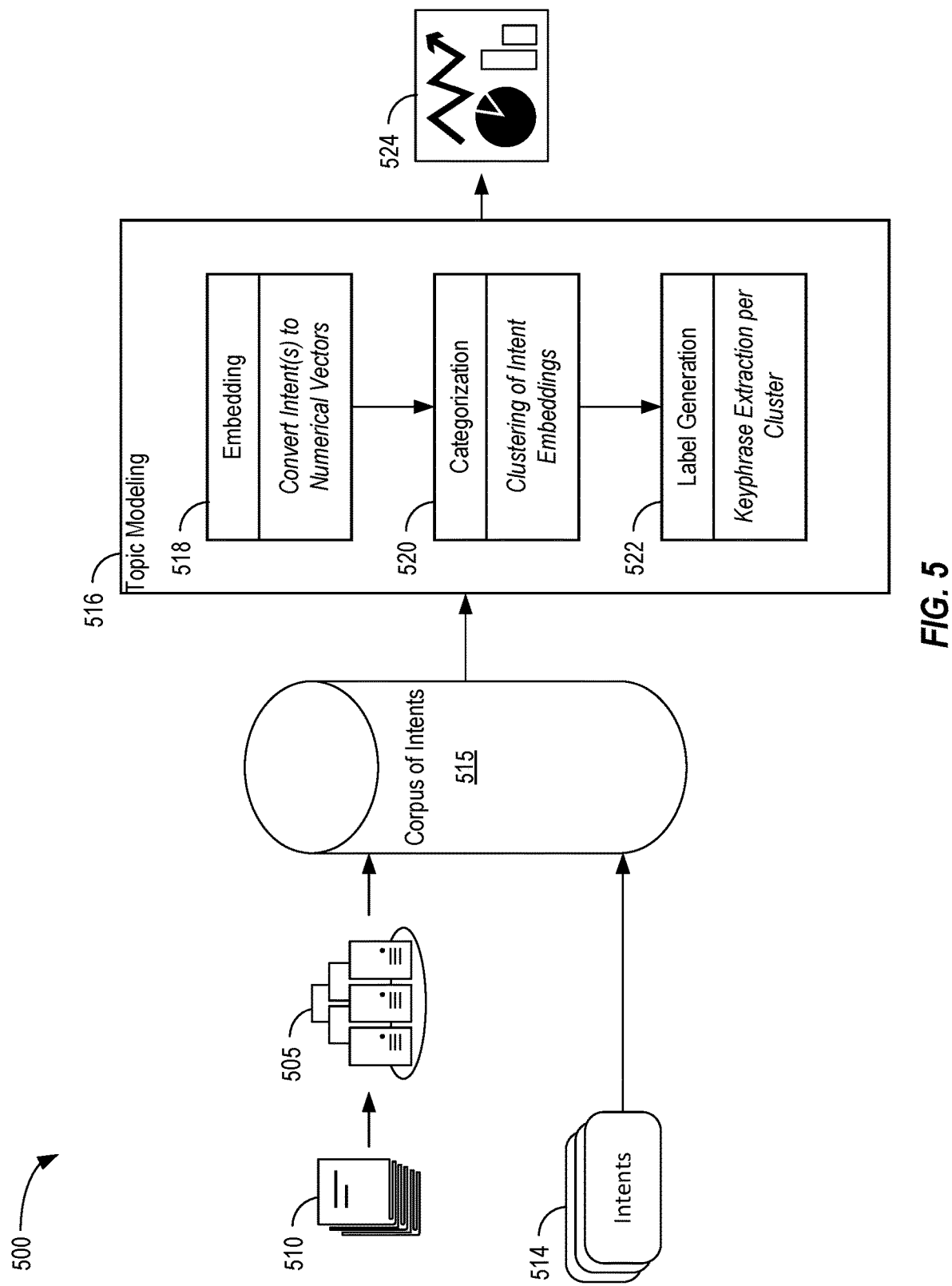
FIG. 5 depicts an illustrative diagram for a process of grouping customer interaction intents using an analytics engine.

Example Process for Grouping Customer Interaction Intents Using an Analytic Engine FIG. 5 depicts an illustrative diagram for a process of grouping customer interaction intents using an analytics engine. In some aspects of the field of intent discovery, additional tools such as an automatic analysis of intents are desired to obtain insights into the topics raised, for example, during an agent and customer interaction. For example, as described herein with reference to step 314 of FIG. 3A the intent discovery apparatus 305 may transmit the detected intent to an analytics engine 307. FIG. 5 provides an example implementation of an analytics engine 307 configured to implement a topic modeling system 516. The illustrative analytics system 500 includes an intent discovery apparatus 505, which may be an implementation of the intent discovery apparatus 305 described herein. As described in more detail herein, the intent discovery apparatus 505 receives interaction transcripts 510. The intent discovery apparatus 505, for example, implementing the intent discovery process depicted and described with reference to FIG. 1 and/or the method 400 depicted and described with reference to FIG. 4, generates detected intents for the interaction transcripts 510 received by the intent discovery apparatus 505. The detected intents can be stored in a datastore 515 containing a corpus of intents generated by the intent discovery apparatus 505 or other means. For example, other intents 514 may be manually loaded by a user of the system or received from other computing sources and stored in the datastore 515.

The topic modeling system 516 of the analytics system 500 can retrieve a plurality of intents from the corpus of intents stored in the datastore 515. The topic modeling system 516 may include multiple tools for aggregating and analyzing intents from interactions. Aggregation and analysis of the intents can help identify insights into business operations, customer issues with a product or service, and/or potential areas for improvements with products or services by identifying the main problems or issues customers are experiencing, prioritizing support, and/or improving its products or services accordingly. Additionally, tracking intents over time can help identify emerging issues, anomalies, trends, and change patterns, which can further be used for prioritizing critical issue handling, and product, service, and feature development and improvement planning. Moreover, the topic modeling system 516 does not need to be prompted to conduct analysis or analytics for a particular purpose or issue.

The topic modeling system 516, through aggregation and analysis of the intents as described in more detail herein, can identify categories of intents present in the corpus of intents and generate groups, which may be hierarchical, so a user, such as a company, can understand the development of issues, topics, and/or trends within the data. In other words, the topic modeling system 516 is configured to infer intent groups from the data without prior knowledge or supervision.

FIG. 5 depicts the topic modeling system 516 including at least three components: an embedding component 518, a categorization component 520, and a label generation component 522. The embedding component 518 receives intents, for example, from the corpus of intents (e.g., the datastore 515). The embedding component 518 converts the textual data structure of the intents into numerical vectors, also referred to as numerical data. The conversion by the embedding component 518 prepares the data for various operations that will be performed by one or more machine learning models. As used in herein, the term "vector" refers to a collection of one or more numbers. For example, each number in a vector represents a magnitude of the vector in a particular dimension. The magnitude may correspond to the number of occurrences of a word or n-gram within a phrase, such as an intent, or within a document. In such cases, each dimension of the vector can correspond to a predefined word or n-gram.

In some aspects, the embedding component 518 implements an embedding process configured to prepare the data for processing using a Sentence Bidirectional Encoder Representation from Transformers (SBERT) model, which is a machine learning framework for natural language processing. Unlike statistical based text analysis, the SBERT model uses semantic features of text to establish contextual relationships and keyphrase extraction. The SBERT model is pre-trained on a large corpus of intent data and then may be fine-tuned on specific types of intents such as those generated within a certain industry or field of service. For example, some industries may utilize highly technical or specific types of communication or vocabulary which require fine-tuned training of the SBERT model so that semantic features may be identified.

Once the intents are embedded using the SBERT model, the topic modeling system 516 implements the categorization component 520 to categorize each transcript using a clustering process. In some aspects, the clustering process may be a Hierarchical Density-Based Spatial Clustering of Applications with Noise (HDBSCAN) model. The categorization component 520 does not require a user to predefine a target or categories sought to be populated by a corpus of intents. That is, the categorization component 520, for example, implementing a HDBSCAN model, in an unsupervised process, that discerns categories and sub-categories that are present within embedded corpus of intents. In some aspects, a user may provide parameters such as a granularity defining the number of categories and/or sub-categories that are desired from a corpus of intents. These parameters may be chosen to maximize the probability to obtain a humanly comprehensible number of categories, for example, 5-7 categories in the case of non-hierarchical clustering, and for example, 20-30 categories, if the clustering is hierarchical.

As categories and sub-categories are discerned by the categorization component 520, overlaps in subject matter of the intents may arise. The label generation component 522 of the topic modeling system 516 is configured to perform a keyphrase extraction process based on the SBERT embeddings. The keyphrase extraction process may include a process referred to as KeyBERT which enables keyword extraction, and which is also referred to herein as topic identification, by finding the sub-phrases such as portions of an intent in the corpus of intents that are the most similar to discerned categories where overlaps exist. In some aspects, similar topics that are extracted using the keyphrase extraction process can be merged into super-topics and assigned a label using an abstractive large language model. For example, the abstractive large language model may generate an abstraction as a label for the categories and/or sub-categories which is based on an idea expressed by the plurality of intents grouped within a particular category and/or sub-category as opposed to an overlapping phrase recited in the intents thereof. Accordingly, the label that is generated for categories and/or sub-categories by the topic modeling system 516 may be a phrase (e.g., a keyphrase) extracted from the overlap of content in the recitations of intents or an abstraction of the intents within the categories and/or sub-categories.

Figure 6:
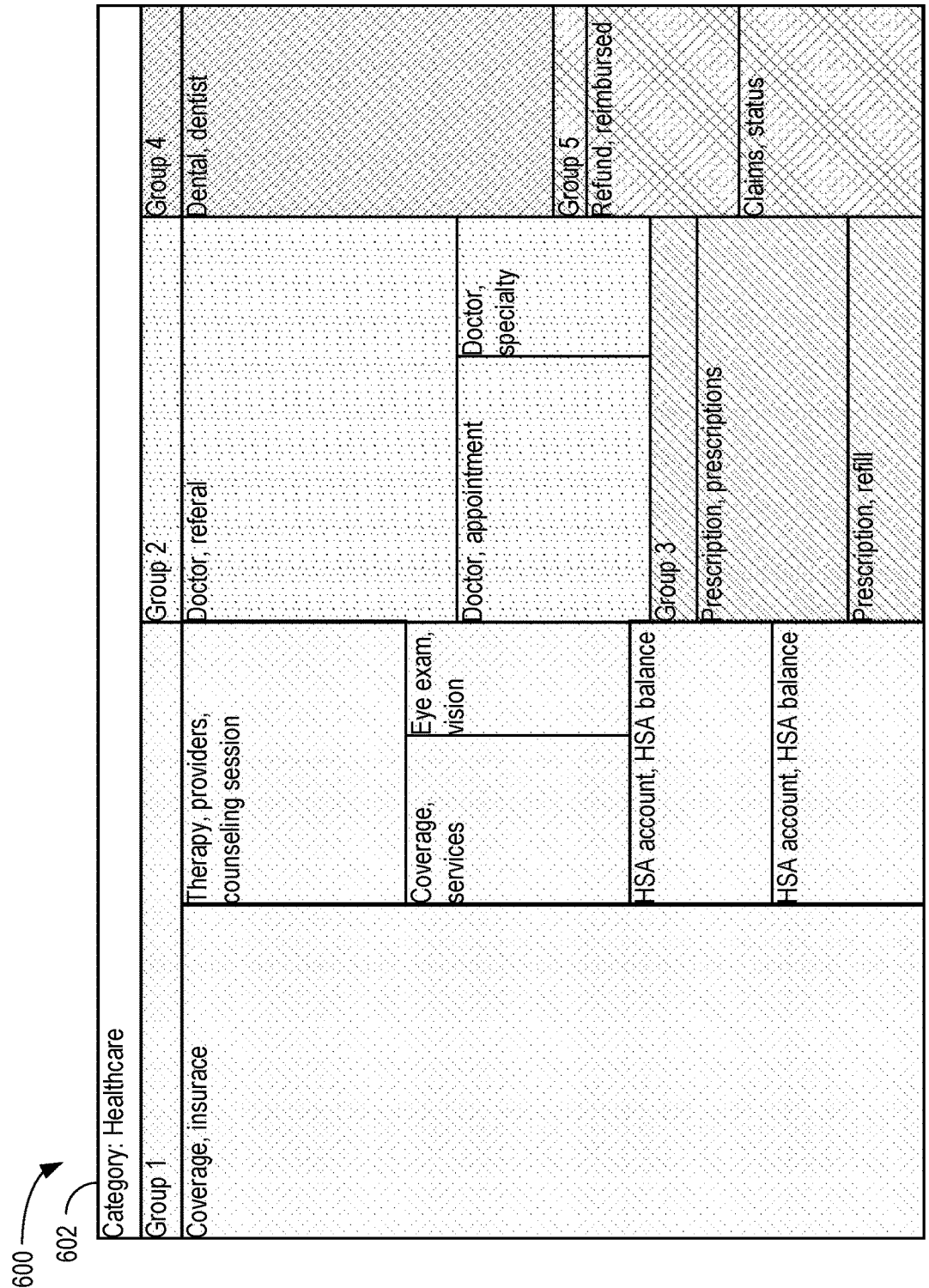
FIG. 6 depicts an illustrative visualization of a structured data generated by the analytics engine from the grouping.

The categories and/or subcategories generated by the topic modeling system 516 may be fed into a visualization component 524. The visualization component 524 generates a visual representation of the topics defined by categories and/or sub-categories of the topic modeling system 516. For example, the visualizations are graphic representations of the labeled data. FIG. 6 depicts an illustrative visualization 600 of the structured data generated by the topic modeling system 516 of the analytics engine. For example, the illustrative visualization 600 includes a treemap 602 that depicts hierarchical (tree-structured) data as a set of nested rectangles. Each branch of the tree is given a rectangle, which is then tiled with smaller rectangles representing sub-branches. The size of the rectangle corresponds to the amount of intents that cluster within the labeled category and sub-categories. For example, the treemap 602 depicted in FIG. 6 is for the broad category of "Healthcare" and there are 5 groups, each with sub-categories defined therein. The treemap 602 provides an easily human-interpretable representation of the topics modeled from the corpus of intents. A user of the topic modeling system 516 may select one or more of the rectangles of the treemap 602 to drill-down into the specific intents categorized within each.

Example Method for Categorization of Intents

Figure 7:
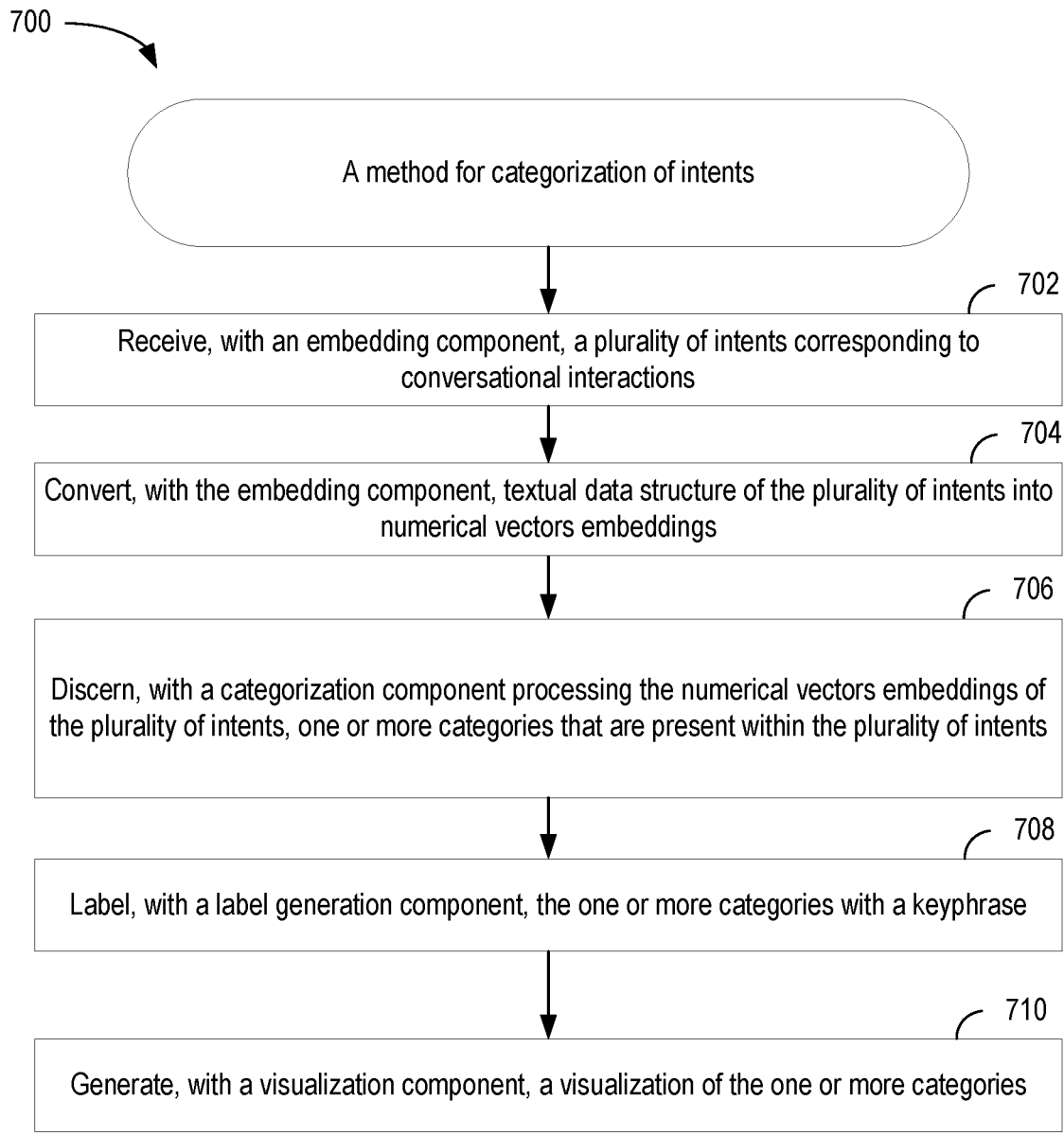
FIG. 7 depicts an illustrative flowchart for an example method for categorization of intents.

FIG. 7 depicts an example method for categorization of intents.

In this example, method 700 begins at step 702 with receiving, with an embedding component, a plurality of intents corresponding to conversational interactions. For example, step 702 may be performed by the topic modeling system 516 as described above with reference to FIG. 5.

Method 700 proceeds to step 704 with converting, with the embedding component, textual data structure of the plurality of intents into numerical vectors embeddings. For example, step 704 may be performed by the embedding component 518 of the topic modeling system 516 as described above with reference to FIG. 5.

Method 700 proceeds to step 706 with discerning, with a categorization component processing the numerical vectors embeddings of the plurality of intents, one or more categories that are present within the plurality of intents. For example, step 704 may be performed by the categorization component 520 of the topic modeling system 516 as described above with reference to FIG. 5.

Method 700 proceeds to step 708 with labeling, with a label generation component, the one or more categories with a keyphrase. For example, step 708 may be performed by the label generation component 522 of the topic modeling system 516 as described above with reference to FIG. 5.

Method 700 proceeds to step 710 with generating, with a visualization component, a visualization of the one or more categories. For example, step 708 may be performed by the visualization component 524 of the topic modeling system 516 as described above with reference to FIG. 5.

In some aspects, the keyphrase generated by the label generation component is a phrase extracted from an overlapping portion of the plurality of intents categorized within each of the one or more categories.

In some aspects, the keyphrase generated by the label generation component is an abstraction based on the plurality of intents categorized within each of the one or more categories.

In some aspects, the method further includes detecting at least one intent of the plurality of intents with a first large language model from an input comprising at least an interaction transcript and an engineered prompt.

In some aspects, the visualization is a treemap.

Note that FIG. 7 is just one example of a method, and other methods including fewer, additional, or alternative steps are possible consistent with this disclosure.

Figure 8:
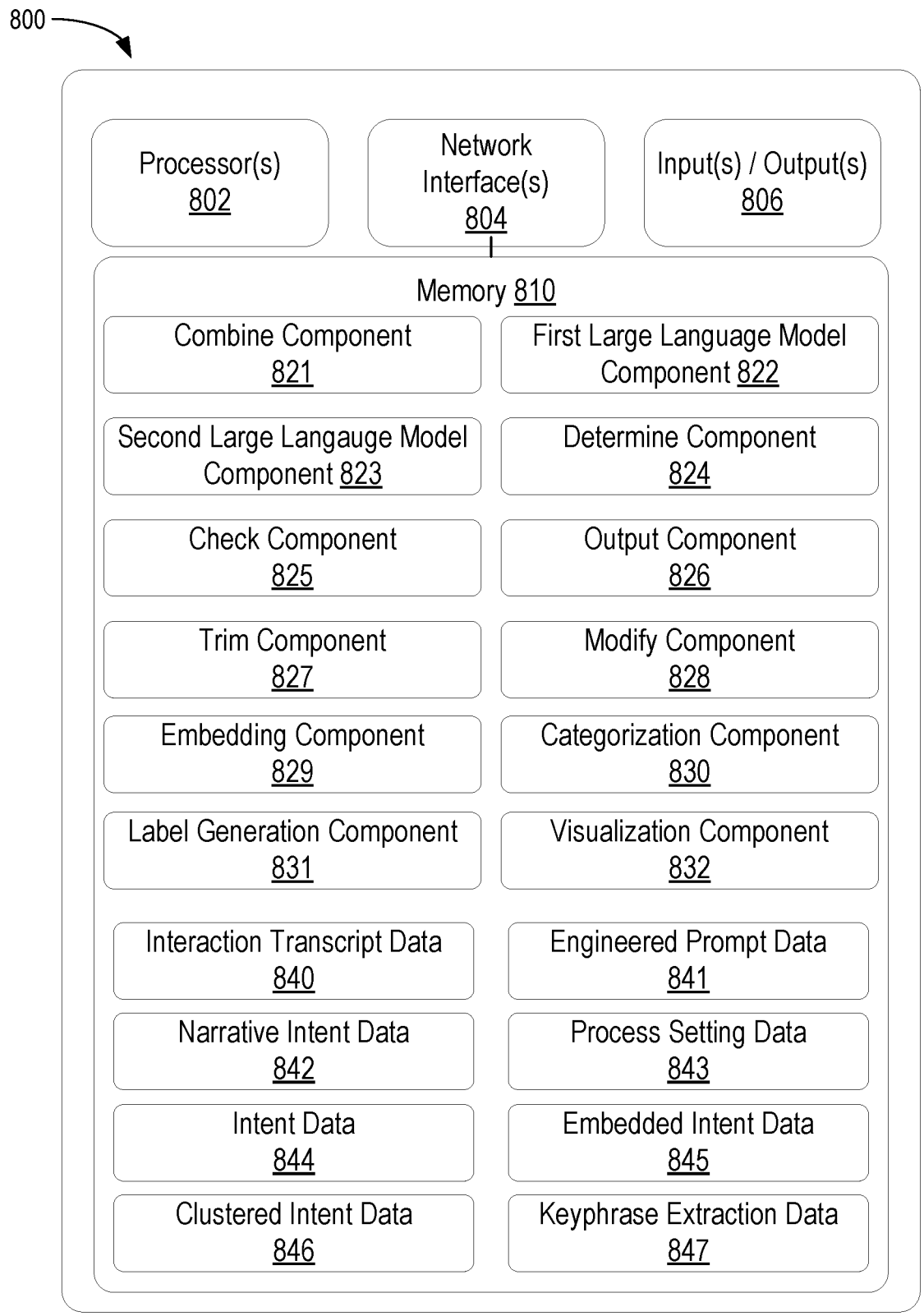
FIG. 8 schematically depicts an example apparatus for implementing the intent discovery process.

Example Processing System for Providing an Intent Expressed in a Conversational Interaction FIG. 8 depicts an example processing system 800 configured to perform the methods described herein. The processing system 800 may be the intent discovery apparatus 305 as described herein.

Processing system 800 includes one or more processors 802. Generally, processor(s) 802 may be configured to execute computer-executable instructions (e.g., software code) to perform various functions, as described herein.

Processing system 800 further includes a network interface(s) 804, which generally provides data access to any sort of data network, including personal area networks (PANs), local area networks (LANs), wide area networks (WANs), the Internet, and the like.

Processing system 800 further includes input(s) and output(s) 806, which generally provide means for providing data to and from processing system 800, such as via connection to computing device peripherals, including user interface peripherals.

Processing system further includes a memory 810 configured to store various types of components and data.

In this example, memory 810 includes a combine component 821, a first large language model component 822, a second large language model component 823, a determination component 824, a checking component 825, an output component 826, a trim component 827, a modify component 828, an embedding component 829, a categorization component 830, a label generation component 831 a visualization component 832.

The combine component 821 is configured to perform step 106 of the intent discovery process depicted and described with reference to FIG. 1 and step 402 of the method 400 depicted and described with reference to FIG. 4.

The first large language model component 822 is configured to perform step 108 of the intent discovery process depicted and described with reference to FIG. 1 and steps 404 and 406 of the method 400 depicted and described with reference to FIG. 4.

The second large language model component 823 is configured to perform step 112 of the intent discovery process depicted and described with reference to FIG. 1.

The determination component 824 is configured to perform step 110 of the intent discovery process depicted and described with reference to FIG. 1 and step 408 of the method 400 depicted and described with reference to FIG. 4.

The checking component 825 is configured to perform step 114 of the intent discovery process depicted and described with reference to FIG. 1 and step 410 of the method 400 depicted and described with reference to FIG. 4.

The output component 826 is configured to perform step 128 of the intent discovery process depicted and described with reference to FIG. 1 and step 412 of the method 400 depicted and described with reference to FIG. 4.

The trim component 827 is configured to perform step 122 of the intent discovery process depicted and described with reference to FIG. 1.

The modify component 828 is configured to perform step 116 of the intent discovery process depicted and described with reference to FIG. 1.

The embedding component 829 is configured to perform processes of the embedding component 518 of the topic modeling system 516 depicted and described with reference to FIG. 5 and step 704 of the method 700 depicted and described with reference to FIG. 7.

The categorization component 830 is configured to perform processes of the categorization component 520 of the topic modeling system 516 depicted and described with reference to FIG. 5 and step 706 of the method 700 depicted and described with reference to FIG. 7.

The label generation component 831 is configured to perform processes of the label generation component 522 of the topic modeling system 516 depicted and described with reference to FIG. 5 and step 708 of the method 700 depicted and described with reference to FIG. 7.

The visualization component 832 is configured to perform processes of the visualization component 524 depicted and described with reference to FIG. 5 and step 710 of the method 700 depicted and described with reference to FIG. 7. For example, the visualization component 832 may cause the visualizations generated by the visualization component 524 depicted and described with reference to FIG. 5 to be displayed on a display device of the input(s) and output(s) 806 of the processing system 800.

In this example, memory 810 also includes interaction transcript data 840, engineered prompt data 841, narrative intent data 842, process setting data 843, intent data 844, embedded intent data 845, clustered intent data 846, and keyphrase extraction data 847.

Interaction transcript data 840 corresponds to recorded conversational interactions which may be transcribed in interaction transcripts for ingestion by the intent discovery process depicted and described herein. Engineered prompt data 841 includes the one or more engineered prompts used to initialize the large language models to perform a desired task such as detect an intent of a customer expressed in the interaction transcript and generate a narrative form of the detected intent. Narrative intent data 842 includes the generated narrative forms of the detected intent. Process setting data 843 includes the confidence score thresholds, data that defines the hyperparameters of the large language models, data that defines the one or more fluency and completeness rules, and other user defined setting of the intent discovery process.

Intent data 844 corresponds to intents received from the corpus of intents (e.g., the datastore 515) depicted and described herein. Embedded intent data 845 includes embeddings generated, for example, by the SBERT model of the embedding component 518 as depicted and described herein. The clustered intent data 846 includes the topics and discerned categories and sub-categories thereof generated by the categorization component 520 as depicted and described herein. The keyphrase extraction data 847 includes the labeled topics that are extracted using the keyphrase extraction process which may also include the super-topics that are assigned a label using the abstractive large language model as depicted and described herein.

Processing system 800 may be implemented in various ways. For example, processing system 800 may be implemented within on-site, remote, or cloud-based processing equipment.

Processing system 800 is just one example, and other configurations are possible. For example, in alternative embodiments, aspects described with respect to processing system 800 may be omitted, added, or substituted for alternative aspects.

Example Clauses

Implementation examples are described in the following numbered clauses:

Clause 1: A method for providing an intent expressed in a conversational interaction in narrative form, comprising: detecting a first intent, with a first large language model, from an input comprising at least an interaction transcript and an engineered prompt; generating, with the first large language model, a first narrative for the first intent and a first confidence score corresponding to a probability that the first intent is an intention in fact expressed in the interaction transcript; determining that the first confidence score is greater than or equal to a threshold; checking that the first narrative for the first intent conforms to one or more fluency and completeness rules, when the first confidence score is determined to be greater than or equal to the threshold; and outputting the first narrative as an output detected intent, when the first confidence score is determined to be greater than or equal to the threshold and when the first narrative for the first intent conforms to the one or more fluency and completeness rules.

Clause 2: The method of Clause 1, further comprising: modifying one or more hyperparameters of the first large language model when the first narrative for the first intent does not conform to the one or more fluency and completeness rules; causing the first large language model to implement the modified one or more hyperparameters and to generate an updated first narrative for the first intent; checking that the updated first narrative conforms to the one or more fluency and completeness rules; and outputting the updated first narrative as the output detected intent, when the updated first narrative conforms to the one or more fluency and completeness rules.

Clause 3: The method of Clause 1, further comprising: determining that the first confidence score is less than the threshold; detecting a second intent, with a second large language model, from the input; generating, with the second large language model, a second narrative for the second intent and a second confidence score corresponding to a probability that the second intent is an intention in fact expressed in the interaction transcript; checking that the second narrative for the second intent conforms to the one or more fluency and completeness rules; and outputting the second narrative as the output detected intent, when the second narrative for the second intent conforms to the one or more fluency and completeness rules.

Clause 4: The method of Clause 3, further comprising: modifying one or more hyperparameters of the second large language model when the second narrative for the second intent does not conform to the one or more fluency and completeness rules; causing the second large language model to implement the modified one or more hyperparameters and to generate an updated second narrative for the second intent; checking that the updated second narrative conforms to the one or more fluency and completeness rules; and outputting the updated second narrative as the output detected intent, when the updated second narrative conforms to the one or more fluency and completeness rules.

Clause 5: The method of any one of Clauses 1-4, further comprising: selecting the first narrative for evaluation by a third large language model; evaluating the input corresponding to the first narrative to generate a validated detected intent in narrative form; and outputting the validated detected intent in narrative form as the output detected intent.

Clause 6: The method of any one of Clauses 1-5, further comprising trimming a length of the first narrative to be equal to or less than a predefined length.

Clause 7: The method of any one of Clauses 1-6, wherein the one or more fluency and completeness rules comprises at least one of a grammar rule, a spelling rule, or a punctuation rule.

Clause 8: The method of any one of Clauses 1-7, further comprising receiving, with an embedding component, a plurality of intents, wherein at least one intent of the plurality of intents comprises the output detected intent; converting, with the embedding component, textual data structure of the plurality of intents into numerical vectors; discerning, with a categorization component processing the numerical vectors embeddings of the plurality of invents, one or more categories that are present within the plurality of intents; and labeling, with a label generation component, the one or more categories with a keyphrase extracted from an overlapping portion of the plurality of intents categorized within each of the one or more categories.

Clause 9: The method of Clause 8, further comprising generating, with a visualization component, a visualization of the one or more categories.

Clause 10: The method of claim 9, wherein the visualization is a treemap.

Clause 11: A method for categorization of intents, comprising: receiving, with an embedding component, a plurality of intents corresponding to conversational interactions; converting, with the embedding component, textual data structure of the plurality of intents into numerical vectors embeddings; discerning, with a categorization component processing the numerical vectors embeddings of the plurality of intents, one or more categories that are present within the plurality of intents; and labeling, with a label generation component, the one or more categories with a keyphrase.

Clause 12: The method of Clause 11, wherein the keyphrase generated by the label generation component is a phrase extracted from an overlapping portion of the plurality of intents categorized within each of the one or more categories.

Clause 13: The method of any one of Clauses 11-12, wherein the keyphrase generated by the label generation component is an abstraction based on the plurality of intents categorized within each of the one or more categories.

Clause 14: The method of any one of Clauses 11-13, further comprising detecting at least one intent of the plurality of intents with a first large language model from an input comprising at least an interaction transcript and an engineered prompt.

Clause 15: The method of any one of Clauses 11-14, further comprising generating, with a visualization component, a visualization of the one or more categories.

Clause 16: The method of Clause 15, wherein the visualization is a treemap.

Clause 17: A processing system, comprising: a memory comprising computer-executable instructions; and a processor configured to execute the computer-executable instructions and cause the processing system to perform a method in accordance with any one of Clauses 1-16.

Clause 18: A processing system, comprising means for performing a method in accordance with any one of Clauses 1-16.

Clause 19: A non-transitory computer-readable medium comprising computer-executable instructions that, when executed by a processor of a processing system, cause the processing system to perform a method in accordance with any one of Clauses 1-16.

Clause 20: A computer program product embodied on a computer-readable storage medium comprising code for performing a method in accordance with any one of Clauses 1-16.

Additional Considerations

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

What is claimed is:

1. A method for providing an intent expressed in a conversational interaction in narrative form, comprising:
    detecting a first intent, with a first large language model, from an input comprising at least an interaction transcript and an engineered prompt;
    generating, with the first large language model, a first narrative for the first intent and a first confidence score corresponding to a probability that the first intent is an intention in fact expressed in the interaction transcript;
    determining that the first confidence score is greater than or equal to a threshold;

checking that the first narrative for the first intent conforms to one or more fluency and completeness rules, when the first confidence score is determined to be greater than or equal to the threshold; and outputting the first narrative as an output detected intent, when the first confidence score is determined to be greater than or equal to the threshold and when the first narrative for the first intent conforms to the one or more fluency and completeness rules.

2. The method of claim 1, further comprising:

modifying one or more hyperparameters of the first large language model when the first narrative for the first intent does not conform to the one or more fluency and completeness rules;

causing the first large language model to implement the modified one or more hyperparameters and to generate an updated first narrative for the first intent;

checking that the updated first narrative conforms to the one or more fluency and completeness rules; and outputting the updated first narrative as the output detected intent, when the updated first narrative conforms to the one or more fluency and completeness rules.

3. The method of claim 1, further comprising:

determining that the first confidence score is less than the threshold;

detecting a second intent, with a second large language model, from the input;

generating, with the second large language model, a second narrative for the second intent and a second confidence score corresponding to a probability that the second intent is an intention in fact expressed in the interaction transcript;

checking that the second narrative for the second intent conforms to the one or more fluency and completeness rules; and outputting the second narrative as the output detected intent, when the second narrative for the second intent conforms to the one or more fluency and completeness rules.

4. The method of claim 3, further comprising:

modifying one or more hyperparameters of the second large language model when the second narrative for the second intent does not conform to the one or more fluency and completeness rules;

causing the second large language model to implement the modified one or more hyperparameters and to generate an updated second narrative for the second intent;

checking that the updated second narrative conforms to the one or more fluency and completeness rules; and outputting the updated second narrative as the output detected intent, when the updated second narrative conforms to the one or more fluency and completeness rules.

5. The method of claim 1, further comprising:

selecting the first narrative for evaluation by a third large language model;

evaluating the input corresponding to the first narrative to generate a validated detected intent in narrative form; and outputting the validated detected intent in narrative form as the output detected intent.

6. The method of claim 1, further comprising trimming a length of the first narrative to be equal to or less than a predefined length.

7. The method of claim 1, wherein the one or more fluency and completeness rules comprises at least one of a grammar rule, a spelling rule, or a punctuation rule.

8. The method of claim 1, wherein the engineered prompt is automatically or manually selected from a predefined list of engineered prompts.

9. An apparatus configured for providing an intent expressed in a conversational interaction in narrative form, comprising: one or more memories comprising processor-executable instructions; and one or more processors configured to execute the processor-executable instructions and cause the apparatus to:

detect a first intent, with a first large language model, from an input comprising at least an interaction transcript and an engineered prompt;

generate, with the first large language model, a first narrative for the first intent and a first confidence score corresponding to a probability that the first intent is an intention in fact expressed in the interaction transcript;

determine that the first confidence score is greater than or equal to a threshold;

check that the first narrative for the first intent conforms to one or more fluency and completeness rules, when the first confidence score is determined to be greater than or equal to the threshold; and output the first narrative as an output detected intent, when the first confidence score is determined to be greater than or equal to the threshold and when the first narrative for the first intent conforms to the one or more fluency and completeness rules.

10. The apparatus of claim 9, wherein the one or more processors are configured to execute the processor-executable instructions and cause the apparatus to:

modify one or more hyperparameters of the first large language model when the first narrative for the first intent does not conform to the one or more fluency and completeness rules;

cause the first large language model to implement the modified one or more hyperparameters and to generate an updated first narrative for the first intent;

check that the updated first narrative conforms to the one or more fluency and completeness rules; and output the updated first narrative as the output detected intent, when the updated first narrative conforms to the one or more fluency and completeness rules.

11. The apparatus of claim 9, wherein the one or more processors are configured to execute the processor-executable instructions and cause the apparatus to:

determine that the first confidence score is less than the threshold;

detect a second intent, with a second large language model, from the input;

generate, with the second large language model, a second narrative for the second intent and a second confidence score corresponding to a probability that the second intent is an intention in fact expressed in the interaction transcript;

check that the second narrative for the second intent conforms to the one or more fluency and completeness rules; and output the second narrative as the output detected intent, when the second narrative for the second intent conforms to the one or more fluency and completeness rules.

12. The apparatus of claim 11, wherein the one or more processors are configured to execute the processor-executable instructions and cause the apparatus to:

modify one or more hyperparameters of the second large language model when the second narrative for the second intent does not conform to the one or more fluency and completeness rules;
cause the second large language model to implement the modified one or more hyperparameters and to generate an updated second narrative for the second intent;
check that the updated second narrative conforms to the one or more fluency and completeness rules; and
output the updated second narrative as the output detected intent, when the updated second narrative conforms to the one or more fluency and completeness rules.

13. The apparatus of claim 9, wherein the one or more processors are configured to execute the processor-executable instructions and cause the apparatus to:
select the first narrative for evaluation by a third large language model;
evaluate the input corresponding to the first narrative to generate a validated detected intent in narrative form; and
output the validated detected intent in narrative form as the output detected intent.

14. The apparatus of claim 9, wherein the one or more processors are configured to execute the processor-executable instructions and cause the apparatus to trim a length of the first narrative to be equal to or less than a predefined length.

15. A method for categorization of intents, comprising:
receiving, with an embedding component, a plurality of intents corresponding to conversational interactions;
converting, with the embedding component, textual data structure of the plurality of intents into numerical vectors embeddings;
discerning, with a categorization component processing the numerical vectors embeddings of the plurality of intents, one or more categories that are present within the plurality of intents; and
labeling, with a label generation component, the one or more categories with a keyphrase.

16. The method of claim 15, wherein the keyphrase generated by the label generation component is a phrase extracted from an overlapping portion of the plurality of intents categorized within each of the one or more categories.

17. The method of claim 15, wherein the keyphrase generated by the label generation component is an abstraction based on the plurality of intents categorized within each of the one or more categories.

18. The method of claim 15, further comprising detecting at least one intent of the plurality of intents with a first large language model from an input comprising at least an interaction transcript and an engineered prompt.

19. The method of claim 15, further comprising generating, with a visualization component, a visualization of the one or more categories.

20. The method of claim 19, wherein the visualization is a treemap.

* * * * *